United States Patent
Schmidt et al.

(10) Patent No.: US 7,099,911 B2
(45) Date of Patent: Aug. 29, 2006

(54) GIVENS ROTATIONS COMPUTATION

(75) Inventors: Michael Schmidt, Dresden (DE);
Ruediger Menken, Ottendorf-Okrilla (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 739 days.

(21) Appl. No.: 10/259,712

(22) Filed: Sep. 27, 2002

(65) Prior Publication Data
US 2003/0163498 A1    Aug. 28, 2003

(30) Foreign Application Priority Data
Feb. 27, 2002    (DE) ............... 102 08 409

(51) Int. Cl.
*G06F 17/10*    (2006.01)

(52) U.S. Cl. ..................... 708/605; 708/323

(58) Field of Classification Search ......... 708/605, 708/323
See application file for complete search history.

(56) References Cited

U.S. PATENT DOCUMENTS

| 5,305,248 A | * | 4/1994 | Ammann ............... 708/502 |
| 6,363,405 B1 | * | 3/2002 | Loginov ............... 708/270 |
| 6,542,917 B1 | * | 4/2003 | Watanabe et al. ....... 708/605 |
| 2003/0002574 A1 | * | 1/2003 | Yang et al. ............ 375/229 |

* cited by examiner

*Primary Examiner*—D. H. Malzahn
(74) *Attorney, Agent, or Firm*—Meyertons Hood Kivlin Kowert & Goetzel, P.C.; B. Noël Kivlin

(57) ABSTRACT

A Givens rotation computation technique is provided that makes use of polynomial approximations of an expression that contains a square root function. The polynomial approximation uses polynomial coefficients that are specifically adapted to respective ones of a number of subintervals within the range of possible values of the input variable of the expression. The technique may be used in data communications devices such as those in wireless local area networks. An example is the application of the Givens rotations technique in a decision feedback equalizer.

38 Claims, 3 Drawing Sheets

GIVENS ROTATIONS COMPUTATION

BACKGROUND OF THE INVENTION

1. Field of the Invention

The invention generally relates to data transformation apparatus and methods, and in particular to the computation of Givens rotations.

2. Description of the Related Art

Givens rotations are widely used in numerical linear algebra and find many application in data communications systems. For instance, in spread spectrum systems such as wireless communications systems, the unitary Givens rotation is commonly used in adaptive filtering, equalization, and fast factorization algorithms.

Given the vectors $\underline{x}_p, \underline{x}_q \in C^n$ with $\underline{x}_p(1) \neq 0$, a Givens rotation is a 2-by-2 unitary matrix $$Q \in C^{2 \times 2}$$

such that $$[\underline{x}_p, \underline{x}_q]Q = [\underline{x}'_p, \underline{x}'_q]$$

where $\underline{x}'_q(1)=0$, i.e. the first element of the second column shall be made zero. Numerically stable solutions are given by $$Q = \begin{bmatrix} \alpha & -\beta \\ \beta^* & \alpha \end{bmatrix} \quad \alpha = \frac{1}{\sqrt{1+|\gamma|^2}} \quad \beta = \gamma\alpha \quad \gamma = \frac{x_q(1)}{x_p(1)} \quad \text{if } |x_q(1)|^2 < |x_p(1)|^2$$

and $$Q = \begin{bmatrix} \beta^* & -\alpha \\ \alpha & \beta \end{bmatrix} \quad \alpha = \frac{1}{\sqrt{1+|\gamma|^2}} \quad \beta = \gamma\alpha \quad \gamma = \frac{x_p(1)}{x_q(1)} \quad \text{if } |x_p(1)|^2 \leq |x_q(1)|^2.$$

These are two types of Givens rotations, and as apparent therefrom, computing a Givens rotation requires in each case the computation of square root functions when determining the value of $\alpha$. In the above example, computation of $$f(\xi) = \frac{1}{\sqrt{1+\xi}}$$

for $\xi=|\gamma|^2 \leq 1$ is required, in order to compute the value of $\alpha$. This computation is cumbersome with respect to the hardware implementation since it involves both square root computation and inversion. In the following, the term square root function denotes any function such as function f shown above, that contains at least one square root, irrespective of whether there are other functional terms included such as that of an inversion.

One way of performing the square root function computation would be to provide a look-up table where for each possible value of $\xi=|\gamma|^2 \leq 1$, the corresponding value of the square root function is stored. However, in order to have a sufficiently high resolution with no sampling noise, the look-up table would be required to be of an inappropriately large size. Moreover, the provision of such look-up table would inadequately increase the manufacturing costs of such circuits.

An alternative would be to apply a polynomial approximation based on the respective binomial series:

$$\frac{1}{\sqrt{1+\xi}} = 1 - \frac{1}{2}\xi + \frac{3}{8}\xi^2 - \frac{5}{16}\xi^3 + \frac{35}{128}\xi^4 - \frac{63}{256}\xi^5 + \frac{231}{1024}\xi^6 - \cdots$$

$$= \sum_{i=0}^{\infty} c_i \xi^i$$

where $\xi=|\gamma|^2 \leq 1$.

Again, in order to compute the square root function with sufficient accuracy, the computational overhead would be inappropriately large. To have for each input value a sufficiently accurate functional value, it would be necessary to compute for each input value a high degree polynomial using the following polynomial coefficients:

| | |
|---|---|
| $c_0$ | +1.000000000000000000 |
| $c_1$ | −0.500000000000000000 |
| $c_2$ | +0.375000000000000000 |
| $c_3$ | −0.312500000000000000 |
| $c_4$ | +0.273437500000000000 |
| $c_5$ | −0.246093750000000000 |
| $c_6$ | +0.225585937500000000 |
| $c_7$ | −0.209472656250000000 |
| $c_8$ | +0.196380615234375000 |
| $c_9$ | −0.185470581054687500 |
| $c_{10}$ | +0.176197052001953125 |
| ... | ... |

Thus, this approach is numerically extensive since it involves a high number of floating point operations.

In order to avoid the need for square root computation, the so called fast Givens rotation may be applied which in addition reduces the required number of multiplications. However, a numerically stable version of the fast Givens rotation involves an increased amount of control overhead and an increased amount of divisions with respect to the standard Givens rotation, which makes its application less attractive for fixed point implementations.

SUMMARY OF THE INVENTION

An improved Givens rotations computation technique is provided that is reliable and efficient, and may allow for performing the Givens rotation in a numerically simpler and less cumbersome manner compared with ordinary Givens rotations schemes as well as square-root free Givens rotations approaches such as the fast Givens rotation technique.

In one embodiment, an apparatus for transforming input data to output data is provided. The apparatus comprises a data processing unit for performing a Givens rotation, where the data processing unit is arranged for determining a value of an input variable of an expression that contains a square root function.

The data processing unit is further arranged for determining a subinterval within a given range of possible values of the input variable with the subinterval containing the determined value. The data processing unit is further ranged for computing a polynomial approximation of the expression using polynomial coefficients that are specifically adapted to the determined subinterval.

In another embodiment, a data transformation method of transforming input data to output data is provided. The transformation includes a Givens rotation that is performed using a polynomial approximation of an expression that contains a square root function. The function has at least one input variable of a given range of possible value. The method comprises determining a subinterval of the range of possible values of the at least one input variable, determining polynomial coefficients of the polynomial approximation, where the polynomial coefficients are specifically adapted to the determined subinterval, and computing the polynomial approximation using the determined polynomial coefficients when the input variable has a value within the subinterval.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
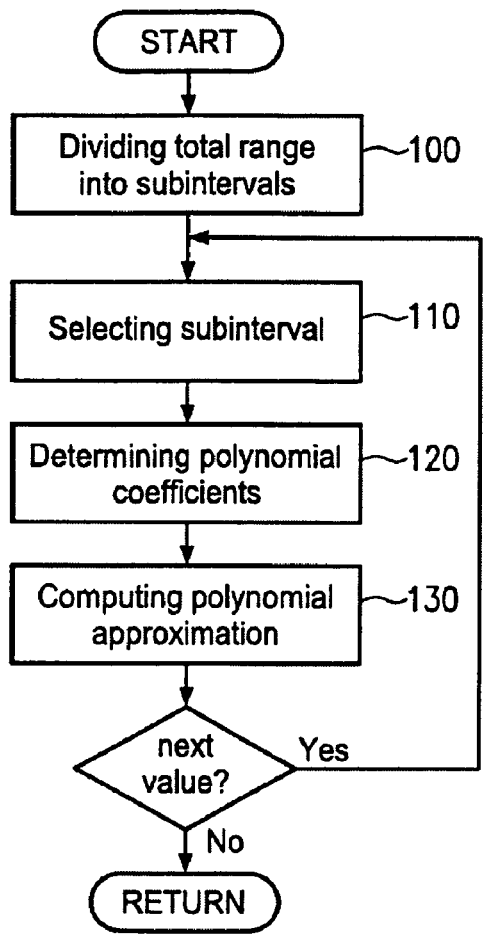
FIG. 1 is a flow chart illustrating an embodiment of a data transformation method.

Referring now to the drawings in particular to FIG. 1 which illustrates a flow chart of a data transformation method according to an embodiment, the Givens rotation to be computed for data transformation purposes, is done by applying different polynomial approximations for different subinterval.

As stated above, the computation of Givens rotations requires the computation of a square root function. In the example above, the square root function was to be computed for determining the values of the parameter α but other implementations of Givens rotations are possible that require the computation of a square root function as well. Taking the above example of computing the parameter α, the present embodiment uses in each subinterval a second degree polynomial $$\frac{1}{\sqrt{1+\xi}} = c_0(i) + c_1(i)\xi + c_2(i)\xi^2 + \varepsilon_i(\xi)$$

where $\xi \in S_i \subset [0,1]$. The coefficients $c_k(i)$ may be optimized with respect to each subinterval $S_i$. This can be achieved by standard methods on polynomial fitting. Moreover, many applications in signal processing are based on fixed point computation. The residual error $\varepsilon(\xi)$ may become irrelevant if it is lower than the smallest fixed point resolution.

In the present embodiment, the range [0,1] of possible values is divided into two subintervals $S_i$ as shown in the table:

| i | $S_i$ |
|---|---|
| 1 | [0, 0.4] |
| 2 | (0.4, 1] |

The polynomial approximation is then separately done for each subinterval $S_i$ leading to the following polynomial coefficients which are therefore specifically adapted to the respective subinterval:

| i | 1 | 2 |
|---|---|---|
| $c_0$ | +1.00000000000000 | +0.97836529737016 |
| $c_1$ | −0.48542774380501 | −0.37431600324069 |
| $c_2$ | +0.24736200418735 | +0.10322099159143 |

That is, the total range of possible values is divided in step 100 of FIG. 1 into subintervals. Then, a subinterval is selected in step 110, and the polynomial coefficients relating to this subinterval are determined in step 120. Using the determined coefficients, the polynomial approximation is computed in step 130. It is then decided in step 140 whether polynomial coefficients need to be determined for another subinterval, and if so, the process reiterates.

It is to be noted that the sequence of steps in the flowchart of FIG. 1 has been chosen for explanatory reasons, and other schemes are possible in alternative embodiments. For instance, step 130 of computing the polynomial approximations could be done collectively for all values at the end of the process of FIG. 1, rather than within each iteration. Further, there might be an embodiment in which the subintervals are predefined so that step 100 of dividing the total range into subintervals can be omitted. Moreover, if there is for instance only one input value $\xi$, there is no need to perform a reiteration.

As shown above, the total range of possible input values is divided in the present embodiment into two subintervals. In other embodiments, the number of subintervals used may be three or four, or may even be above that. It is however to be noted that the number of two subintervals is sufficient in many cases.

Moreover, as apparent from the above table showing the subintervals, the widths of the subintervals may differ. In the present embodiment, the first subinterval $S_1$ has a width of 0.4 whereas the width of the second subinterval $S_2$ is 0.6. That is, the width of one of the two subintervals is about 1.5 times the width of the other one of the two subintervals. Moreover, it is contemplated that the width of the subinterval containing the smaller input values is smaller than the width of the subinterval containing the larger input values.

As described above, the present embodiment makes use of a second degree polynomial for approximating the function in each subinterval. While the use of a second degree polynomial has been found to be sufficient for many applications, other embodiments are possible where polynomials of different degree are used. For instance linear approximations, i.e. first degree polynomials, can be used in particular when dividing the input range into more than two subintervals. In other embodiments, higher degree polynomials may be used.

In the embodiments, the polynomial coefficients are determined for each subinterval. This may be done by minimizing the error function $\epsilon_i(\xi)$ shown above which is an indication of the difference between the result values obtained by the polynomial approximation and the respective values that were obtainable using the square root function itself. This minimization may be done by approximations such that a weighted sum of the squares of the errors is least.

It is to be noted, that the resulting polynomial coefficients differ from that of the binomial series mentioned above since the polynomial coefficients used in the embodiment were optimized to the respective subinterval. For instance, while $c_1$ of the binomial series is −0.5, the corresponding value for the first subinterval is about −0.485, and for the second subinterval about −0.374. Even $c_0$ for the second subinterval differs from unity. Thus, by using polynomial coefficients that are optimized to the respective subinterval, the approximation is better than the approximation using a binomial series of the same degree. This allows for reducing the degree of the polynomial, thus reducing the computational overhead and simplifying the numerical algorithm.

The Givens rotations computation technique using polynomial approximations in subintervals can be used in any application where a Givens rotation is to be computed. For instance, the technique may be used in adaptive filtering, equalization, and fast factorization algorithms. Other applications in data communications systems may be possible. In the following, an embodiment will be described in more detail where the Givens rotation is applied in a decision feedback equalizer of a receiver in a (direct sequence) spread spectrum system such as a WLAN (Wireless Local Area Network) system.

Spread spectrum systems are usually designed to cope with mulitpath propagation and, hence, do not require an additional equalizer compared with single carrier systems. However, the spreading gain for CCK (Complementary Code Keying) at 11 Mbps is only two. Therefore, CCK-11 degrades considerable more than all other WLAN modes in a multipath environment. In fact, this modulation scheme can be regarded as single carrier block coded QPSK (Quadrature Phase Shift Keying) modulation with coding rate 1/2. The degradation is already caused by interchip interference. A powerful and simple equalization concept to combat interference is the use of a decision feedback equalizer. The purpose of the decision feedback equalizer may be to reduce interchip interference in the CCK-11 signal.

Figure 2:
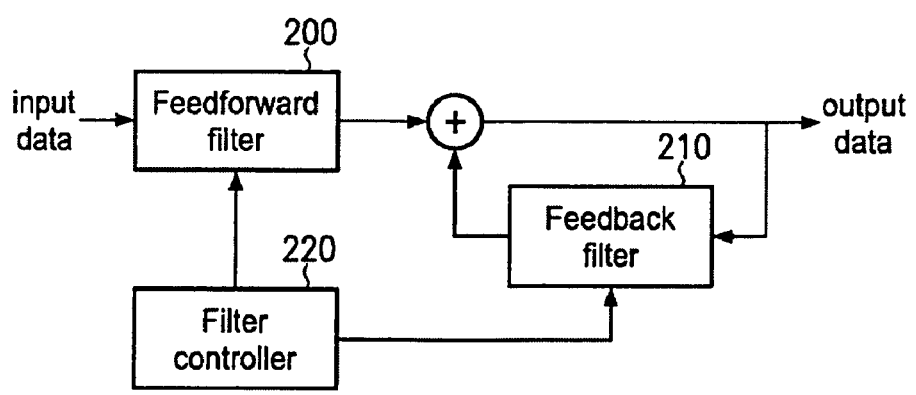
FIG. 2 illustrates a decision feedback equalizer according to an embodiment.

Referring now to FIG. 2, a block diagram illustrating a decision feedback equalizer according to an embodiment is shown. The decision feedback equalizer consists of two filters, a feedforward filter 200 and a feedback filter 210. The input to the feedforward filter 200 is the received signal sequence. The feedback filter 210 feeds the output data back so that the output data can be combined with the output sequence of the feedforward filter 200. There may be additionally a decision unit (not shown) provided that receives the output data and that is connected to the feedback filter 210 so that the feedback filter 210 actually receives its input from that decision unit.

In the embodiment of FIG. 2, the feedforward filter 200 and the feedback filter 210 are controlled by filter controller 220. It is to be noted that other embodiments are possible where only one of the feedforward filter 200 and the feedback filter 210 is controlled by the filter controller 220.

The control of the feedforward filter 200 and the feedback filter 210 is done by sending control signals from the filter controller 220 to the respective filters. These control signals indicate filter coefficient data defining filter coefficients to be used by the filters. The generation of the filter coefficient data includes the computation of Givens rotations, as discussed in more detail below. More specifically, the computation of optimum filter coefficients may be based on a fast Cholesky factorization algorithm which in turn can be split into a series of Givens rotations.

Figure 3:
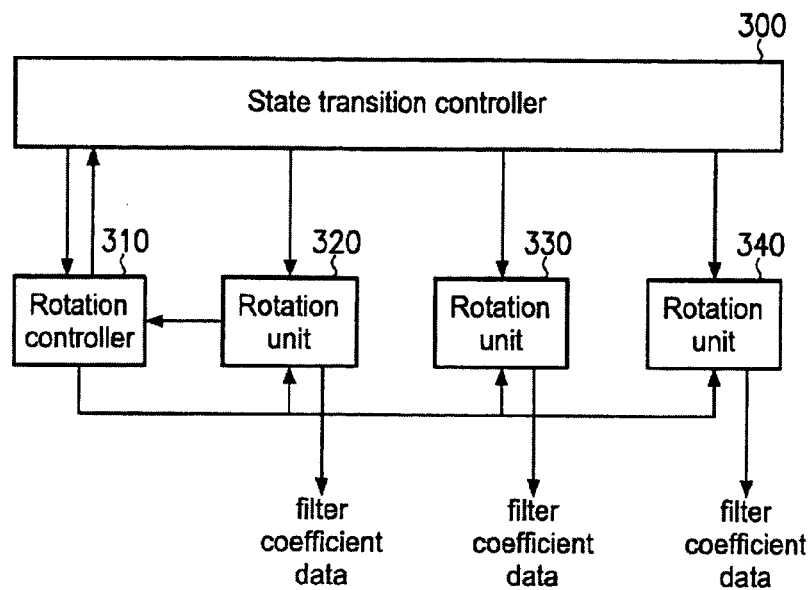
FIG. 3 illustrates the filter controller of the decision feedback equalizer of FIG. 2.

FIG. 3 illustrates the filter controller 220 of FIG. 2 in more detail. The filter controller 220 comprises a rotation controller 310 and three rotation units 320, 330, 340. The Givens rotation is done by the rotation units. For this purpose, the rotation units 320, 330, 340 receive the parameters α and β from rotation controller 310 (the complex-conjugated value of parameter β, i.e. the value of β*, may be derived from β and needs therefore not be provided separately). That is, the rotation controller 310 generates the parameter α (and the real and imaginary parts of the parameter β) and thus performs the polynomial approximation of the square root function for determining the value of α.

Thus, the polynomial approximation is done by rotation controller 310 while the Givens rotations are then actually performed by the rotation units 320, 330, 340. As the filter coefficient data is the result of the data transformation including the Givens rotations, this data is output by the rotation units 320, 330, 340. For determining the elements of the Givens rotation matrix, the rotation controller 310 receives input from rotation unit 320, and from state transition controller 300. The state transition controller 300 generates control signals to the rotation controller 310 and the rotation units 320, 330, 340 for controlling the filter controller 220 to step through respective control states. The state transition controller 300 may receive input from the rotation controller 310 to determine the correct states.

The computation of the Givens rotation matrix elements will now be described in more detail with reference to FIG. 4. This figure illustrates the units of the rotation controller 310. As apparent from the figure, the rotation controller 310 comprises two data path mappers 400, 420 that are interconnected by output registers 410 as well as an expression calculator 430. The output registers 410 comprises a number of registers for storing the parameters α and β, and other parameters. The values stored in the registers are output to the rotation units 320, 330, 340, at least in case of parameters α and β, and output to the state transition controller 300. Further, there may be values stored in the registers that are neither output to the rotation units 320, 330, 340 nor to the state transition controller 300. These values are solely for being provided to the first data path mapper 400, together with the other stored values.

The first data path mapper 400 is connected to one 320 of the rotation units and to the state transition controller 300. Further, the first data path mapper 400 receives input from registers 440 that store constants. Based on the input from the state transition controller 300, the first data path mapper 400 selects data received from rotation unit 320, the output registers 410 and the constants registers 440 and maps the selected data to its output port to be submitted to the expression calculator 430.

The expression calculator 430 includes a network of addition, multiplication and division circuits for generating a number of output signals indicating values of expressions that are derived by adding, multiplying and/or dividing some of the input data by other input data. The operation of the expression calculator 430 may be made dependent on certain inputs from the state transition controller 300 to perform the actual Cholesky factorization.

The output values generated by the expression calculator 430 are forwarded to the second data path mapper 420. The second data path mapper 420 operates similarly to the first data path mapper 400, i.e. it receives input from the state transition controller 300 for selecting some of the input values received from the expression calculator 430 and from initialisation registers 450, to be passed to the output registers. The initialisation registers 450 store initialisation values.

Figure 4:
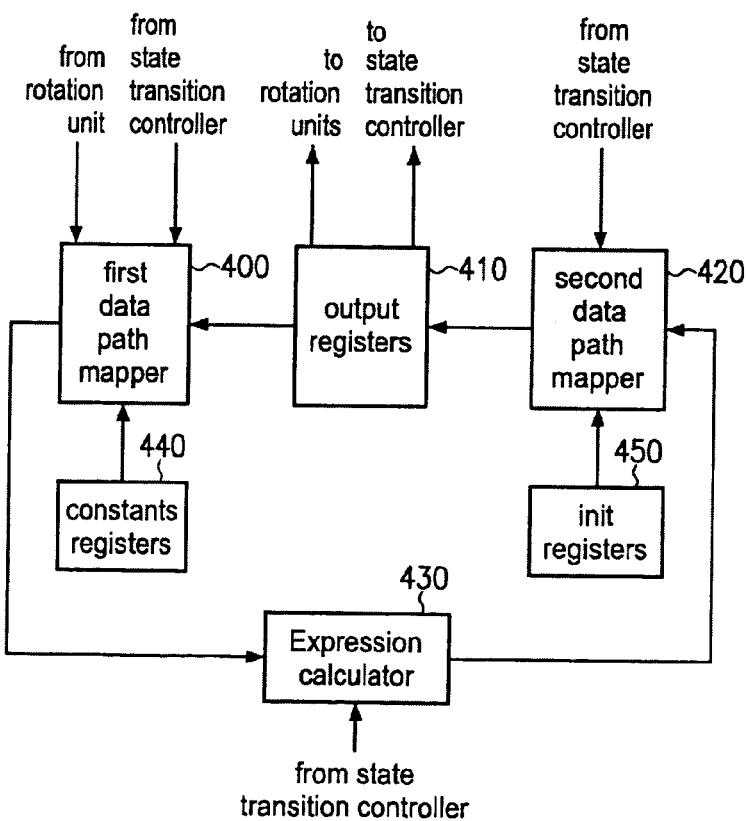
FIG. 4 illustrates the rotation controller shown in FIG. 3.

As apparent from FIG. 4, the rotation controller 310 of the filter controller 220 in the decision feedback equalizer includes hardware circuitry for calculating the values for performing the Givens rotation on-chip, by storing a plurality of constant values in registers 440, 450 and using these constant values to calculate the Givens rotation matrix elements. These elements are output to the rotation units 320, 330, 340 and form the basis for computing the Givens rotations.

Figure 5:
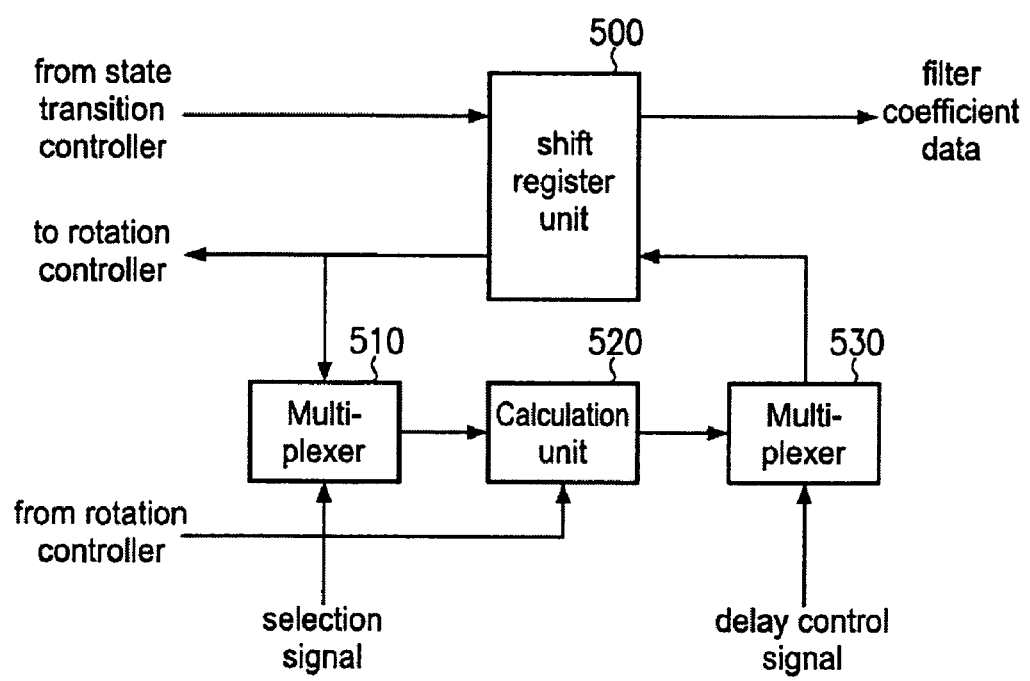
FIG. 5 illustrates a rotation unit shown in FIG. 3.

An embodiment of the rotation units 320, 330, 340 is illustrated in FIG. 5. The Givens rotations matrix elements α and p generated by the rotation controller 310 are input to a calculation unit 520. The rotation units 320, 330, 340 further comprise a shift register unit 500 that includes several shift register banks. Driven by the state transition controller 300, the shift register unit 500 receives input from the calculation unit 520 and generates output to the rotation controller 310 and to the calculation unit 520. Further, the shift register unit 500 outputs the filter coefficient data to the feedforward filter 200 and/or the feedback filter 210 of the decision feedback equalizer.

Further, there may be multiplexer units 510, 530 provided to select signals output by the shift register unit 500, for the purpose of being input to the calculation unit 520, and controlling the delay of the calculated data before being passed to the shift register unit 500.

As apparent from the foregoing, a technique is provided for computing the Givens rotation that is reliable and efficient, and that may be numerically simpler and less cumbersome than ordinary Givens rotations techniques as well as other approaches such as the square-root free fast Givens rotation. By applying polynomial approximations that are specifically adapted to subintervals of the total range of possible input values, the degree of the polynomials may be decreased, thus improving the efficiency and reducing the number of component parts needed. In particular in WLAN receivers, the technique may be used in decision feedback equalizers, and the polynomial approximation may be computed in a hardware circuit different from the circuit where the Givens rotation is actually performed.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A communications device for use in a spread spectrum system comprising:
a decision feedback equalizer having a feedforward filter and a data processing unit configured to perform a Givens rotation, said data processing unit being arranged for determining a value of an input variable of an expression containing a square root function, determining a subinterval within a given range of possible values of said input variable, said subinterval containing said determined value, and computing a polynomial approximation of said expression using polynomial coefficients specifically adapted to the determined subinterval, wherein said data processing unit is connected to said feedforward filter and configured to control the operation of said feedforward filter based on results of said Givens rotation.

2. The apparatus of claim 1 wherein:
said range of possible, values of said input variable is divided into a number of subintervals such that each of said possible values of said input variable falls within one of said subintervals; and
the polynomial coefficients adapted to one of said subintervals are different from the polynomial coefficients adapted to the other subintervals.

3. The apparatus of claim 2 wherein said number of subintervals is two.

4. The apparatus of claim 3 wherein said two subintervals are of different width.

5. The apparatus of claim 4 wherein the width of one of said two subintervals is about 1.5 times the width of the other one of said two subintervals.

6. The apparatus of claim 2 wherein said range of possible values of said at least one input variable is from zero to unity.

7. The apparatus of claim 1 wherein said polynomial approximation of the expression containing a square root function is an approximation using a second degree polynomial.

8. The apparatus of claim 1 wherein said expression contains the reciprocal of a square root function.

9. The apparatus of claim 8 wherein said expression is the reciprocal of the square root of the sum of unity and said input variable.

10. The apparatus of claim 9 wherein said range of possible values of said at least one input variable ranges from zero to unity.

11. The apparatus of claim 1 wherein said polynomial coefficients are adapted to the determined subinterval by minimizing an error value indicative of the difference between the result values obtained by the polynomial approximation and the respective values obtainable using said expression containing the square root function.

12. The apparatus of claim 1 being a data communications device having an adaptive filtering circuit comprising said data processing unit.

13. The apparatus of claim 1 being a data communications device having an equalization circuit comprising said data processing unit.

14. The apparatus of claim 1 being a data communications device having a fast factorization circuit comprising said data processing unit.

15. The apparatus of claim 1 further comprising a storage unit for storing a number of different sets of polynomial coefficients, each set of polynomial coefficients being associated with one of a number of subintervals of said given range of possible values of said input variable.

16. The apparatus of claim 1 further comprising a storage unit for storing a plurality of constant values, wherein said data processing unit is arranged for calculating said polynomial coefficients using said constant values.

17. The apparatus of claim 1 wherein said data processing unit is connected to a feedback filter of said decision feedback equalizer to control the operation of said feedback filter.

18. The apparatus of claim 1 being a WLAN (Wireless Local Area Network) receiver.

19. The apparatus of claim 1 being an integrated circuit chip, wherein said data processing unit includes hardware circuitry for performing said Givens rotation on-chip.

20. The apparatus of claim 19 wherein said data processing unit includes hardware circuitry for determining the polynomial coefficients, the hardware circuitry for performing said Givens rotation being separated from the hardware circuitry for determining the polynomial coefficients.

21. A data transformation method of transforming input data to output data in communications device usable in a spread spectrum system, the transformation including a Givens rotation, the Givens rotation being performed using a polynomial approximation of an expression containing a square root function, the function having at least one input variable of a given range of possible values, said method comprising:
   determining a subinterval of said range of possible values of said at least one input variable;
   determining polynomial coefficients of the polynomial approximation, said polynomial coefficients being specifically adapted to the determined subinterval;
   computing the polynomial approximation using the determined polynomial coefficients when said input variable has a value within said subinterval;
   providing one or more filter coefficients to a filter in said communications system, wherein said filter coefficients are based on said transformation including the Givens rotation; and
   filtering data signals in said communications device, wherein said filtering is performed using said one or more filter coefficients.

22. The method of claim 21 further comprising:
   dividing said range of possible values of said at least one input variable into a number of subintervals such that each of said possible values of said at least one input variable falls within one of said subintervals;
   determining polynomial coefficients adapted to each of said number of subintervals; and
   for each value of said input variable, computing the polynomial approximation using the polynomial coefficients adapted to the respective subinterval.

23. The method of claim 22 wherein said number of subintervals is two.

24. The method of claim 23 wherein said two subintervals are of different width.

25. The method of claim 24 wherein the width of one of said two subintervals is about 1.5 times the width of the other one of said two subintervals.

26. The method of claim 22 wherein said range of possible values of said at least one input variable is from zero to unity.

27. The method of claim 21 wherein said polynomial approximation of the expression containing a square root function is an approximation using a second degree polynomial.

28. The method of claim 21 wherein said expression contains the reciprocal of a square root function.

29. The method of claim 28 wherein said expression is the reciprocal of the square root of the sum of unity and said input variable.

30. The method of claim 29 wherein said range of possible values of said at least one input variable ranges from zero to unity.

31. The method of claim 21 wherein said polynomial coefficients are adapted to the determined subinterval by minimizing an error value indicative of the difference between the result values obtained by the polynomial approximation and the respective values obtainable using said expression containing the square root function.

32. The method of claim 21 wherein said transformation using the Givens rotation is an adaptive filtering of data signals in a data communications device.

33. The method of claim 21 wherein said transformation using the Givens rotation is an equalization of data signals in a data communications device.

34. The method of claim 21 wherein said transformation using the Givens rotation is performed in a fast factorization algorithm in a data communications device.

35. The method of claim 21 wherein said transformation using the Givens rotation is performed in a decision feedback equalizer in said communications device usable in a spread spectrum system, said decision feedback equalizer including the filter controller.

36. The method of claim 35 wherein said Givens rotation is performed in a feedforward filter of said decision feedback equalizer.

37. The method of claim 35 wherein said Givens rotation is performed in a feedback filter of said decision feedback equalizer.

38. A communications device for use in a spread spectrum system comprising:
   a decision feedback equalizer having a feedback filter and a data processing unit configured to perform a Givens rotation, said data processing unit being arranged for determining a value of an input variable of an expression containing a square root function, determining a subinterval within a given range of possible values of said input variable, said subinterval containing said determined value, and computing a polynomial approximation of said expression using polynomial coefficients specifically adapted to the determined subinterval, wherein said data processing unit is connected to said feedback filter to control the operation of said feedback filter based on results of said Givens rotation.

* * * * *